UNITED STATES PATENT OFFICE.

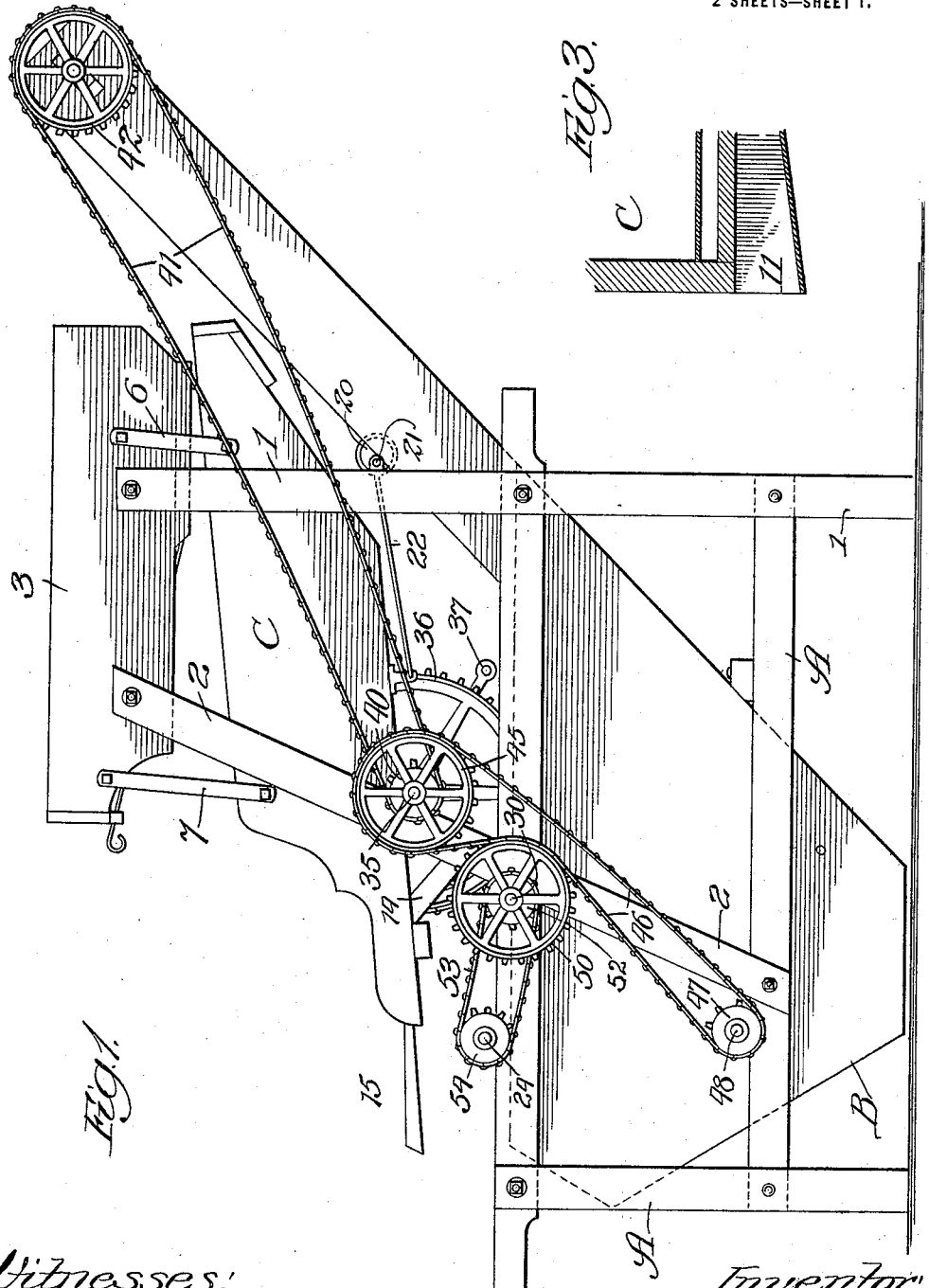

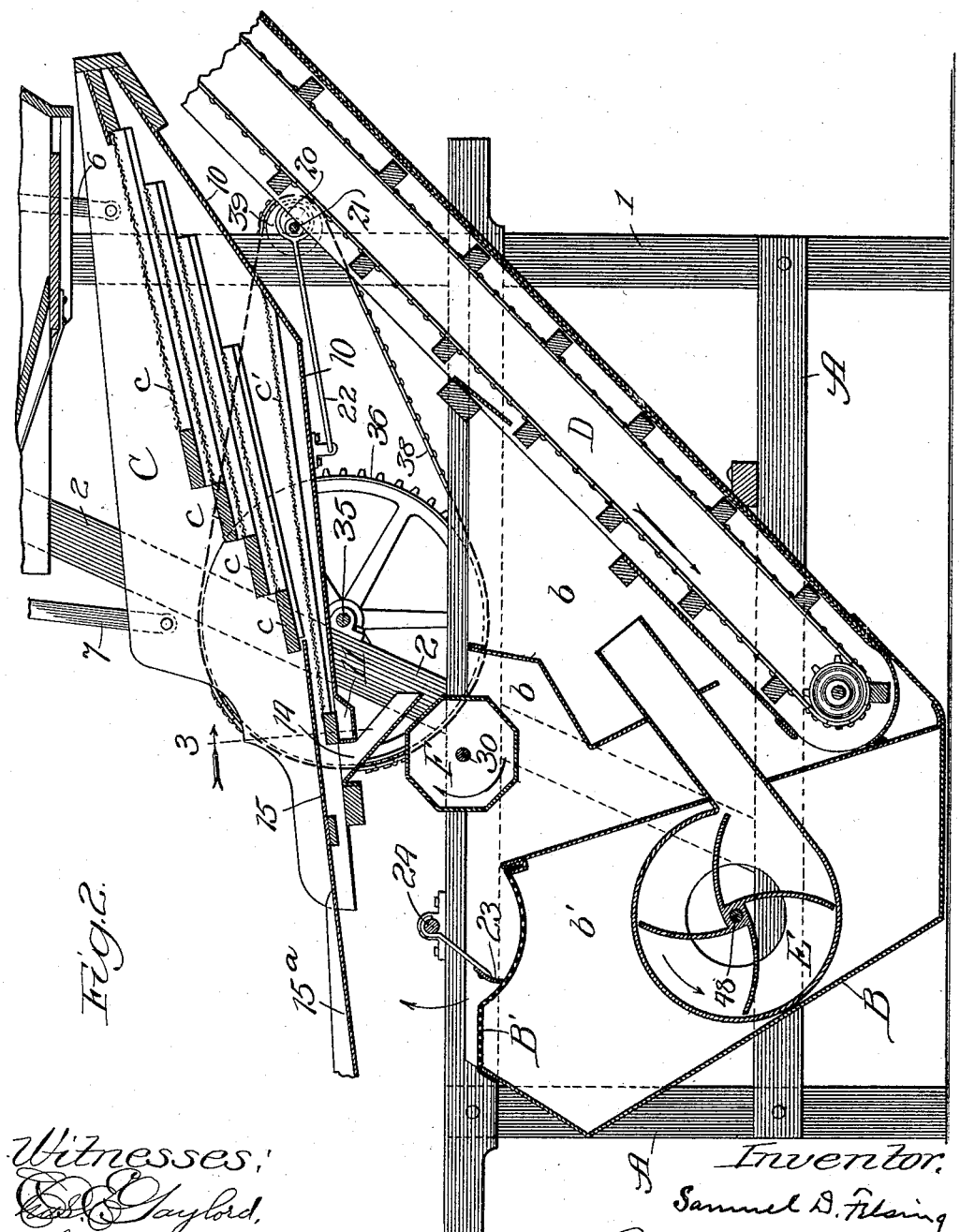

SAMUEL D. FELSING, OF CROOKSTON, MINNESOTA, ASSIGNOR OF ONE-HALF TO CHARLES LORING, OF CROOKSTON, MINNESOTA.

MACHINE FOR SCREENING, CLEANING, AND SEPARATING SEED-GRAIN.

1,149,567.  Specification of Letters Patent.  Patented Aug. 10, 1915.

Application filed August 5, 1911. Serial No. 642,521.

*To all whom it may concern:*

Be it known that I, SAMUEL D. FELSING, a citizen of the United States, and a resident of Crookston, county of Polk, State of Minnesota, have invented certain new and useful Improvements in Machines for Screening, Cleaning, and Separating Seed-Grain, of which I do declare the following to be a full, clear, and exact description, reference being had to the accompanying drawings, forming part of this specification.

The main object of the present invention is to provide a simple and effective machine whereby grain in the condition in which it leaves a threshing machine may, at one operation, be readily and thoroughly cleaned, so as to adapt it to be used for seeding purposes.

To this end my invention consists in the features of novelty and combination of parts hereinafter described, illustrated in the accompanying drawings and particularly pointed out in the claim at the end of this specification.

Figure 1 is a view in side elevation of a machine embodying my invention. Fig. 2 is a view in vertical longitudinal section upon an enlarged scale, the upper portion of the machine being omitted. Fig. 3 is a fractional view in vertical section through the discharge trough at the end of the bottom plate 10.

In Letters Patent No. 995,853, granted to my assignee, Charles Loring and myself jointly, June 20, 1911, there is described and claimed a machine for cleaning and separating seed grain which in practice has been found most advantageous and it is to this machine that my present invention is shown as applied.

The framework A of the machine may be of any suitable character and, as shown, it has upwardly extending bars 1 and 2 arranged upon opposite sides, these bars serving to support a hopper 3 at their upper ends. The hopper 3 may be of any suitable character adapted to receive the grain to be cleaned and will be provided in its lower portion with a suitable slide or gate to control the flow of grain therefrom. Below the hopper 3 and suspended therefrom by the pivot links 6 and 7 is the shoe C that comprises a plurality of superposed screens $c$. The mesh of the screens $c$ may be varied and beneath the screens $c$ extends a screen $c'$ of a mesh too fine to permit the seed grain to pass therethrough, while at the same time allowing very small seed, grains of sand and similar impurities to fall therethrough onto the bottom plate 10 of the shoe. This bottom plate 10 extends from side to side between the side walls of the shoe and at the front of the plate is arranged a trough 11 adapted to receive material that passes the lowermost screen $c'$ and discharge the same outside of the machine.

The seed grain that passes through the series of screens $c$ onto the screen $c'$ will be delivered from the screen $c'$ into a chute 14, down which it will pass into the cleaning chamber of the water tank above which the screening apparatus is mounted. From the lowermost screen $c$ extends a plate 15 by which the screenings will be carried away, this plate 15 terminating in a discharge spout or apron $15^a$ that extends above the discharge end of the water tank beneath it.

The shaking motion may be imparted to the shoe C in any of the usual or suitable ways as, for example, by eccentrics 20 mounted upon a shaft 21, these eccentrics being connected with the bottom of the shoe C by pitman straps or rods 22.

The tank B that is mounted within the framework of the machine below the preliminary cleaning mechanism, above described, is substantially the same in construction and mode of operation as the tank set forth in the above mentioned Letters Patent No. 995,853. That is to say, the tank B comprises a cleaning chamber $b$ and a supply chamber $b'$ within which latter chamber is arranged a suitable pump E for forcing the liquid from the supply chamber into a compartment of the cleaning chamber. In this construction, as in that of the patent hereinbefore mentioned, a conveyer D is employed for removing the cleaned grain from the bottom of the tank, and there extends over the supply chamber, a screen B' with which coöperates a blade or wiper 23 that is driven by a shaft 24 journaled in bearings at the top of the main frame.

Within the expanded upper portion of the cleaning chamber $b$ of the tank there is arranged a hollow, sheet metal drum or roller F that is mounted upon a shaft 30 journaled in suitable bearings in the upper portion of the main frame A. This drum or roller F is arranged beneath the grain discharge spout 14 of the shoe, so that as this spout delivers the screened grain into the top of the cleaning chamber b of the tank, it will be caused to pass below the surface of the water within such chamber and, hence, all of the screened grain will be prevented from floating off with the refuse or lighter material onto the perforated cover B'.

Beneath the shoe C of the machine and extending from side to side of the main frame, is the main drive shaft 35 on one end of which is keyed a large sprocket wheel 36 that is driven by a crank handle 37. Over this sprocket wheel 36 passes a sprocket chain 38 that extends around a small sprocket wheel 39, keyed to one end of the eccentric shaft 21. On the opposite end of the main drive shaft 35 is keyed a small sprocket wheel 40 around which passes a sprocket chain 41 to a sprocket wheel 42 at the upper end of the conveyer D. On this same end of the main drive shaft 35 is also keyed a sprocket wheel 45 around which passes a sprocket chain 46 that passes around a sprocket wheel 47 on the pump drive shaft 48. The sprocket chain 46 also engages a sprocket wheel 50 keyed to the shaft 30 of the drum or roller F to insure the rotation of such drum or roller. On the shaft 30 is also keyed a sprocket wheel 52 around which passes a sprocket chain 53 which passes around a sprocket wheel 54 keyed to the shaft 24 that carries the blade or wiper 23.

From the foregoing description, the operation of my improved apparatus will be seen to be as follows: The grain to be cleaned will be delivered from the hopper 3 onto the uppermost screen c within the shoe C, and under the agitation of the shoe the grain will fall through the several screens c onto the screen c' of finer mesh, while the chaff and other refuse separated from the grain by the screens c will pass onto the plate or apron 15 and will be discharged thence from the machine. As the grain passes downward over the fine screen c' any dirt, very fine seeds or like material which is to be separated from the seed grain, will fall through the screen c' onto the plate 10 and will be delivered into the trough 11 at the front end of this plate 10, whence it will be discharged at one side of the machine. The seed grain will pass from the surface of the screen c' into the delivery chute 14 by which it will be delivered onto the surface of the water within the cleaning chamber b of the tank B. It will be understood that by the shafts and gear mechanism above described, the shoe C will be agitated, the drum F will be caused to rotate in the direction of the arrow, Fig. 2, the pump E will be caused to force water from the supply chamber b' into the compartments of the cleaning chamber b, the conveyer D will be driven in the direction of the arrow, Fig. 2, and the discharge blade or wiper 23 will be rotated in the direction of the arrow, Fig. 2. As the grain, and any light material associated therewith, falls upon the surface of the water within the cleaning chamber b, they will be caused, by the drum F, to pass beneath the surface of the water and the grain will fall through the cleaning chamber b and against the upwardly ascending current of water to the bottom of the cleaning chamber, whence it will be carried away by the flights or slats of the conveyer D, as in the structure shown in my hereinbefore mentioned patent. The lighter material will pass over the top edge of the diaphragm that separates the cleaning chamber b from the supply chamber b' of the tank B and onto the perforated cover B' from which it will be discharged by the revolving blade or wiper 23.

By employing the sieves of different mesh I am enabled to make a perfect separation of foul seed, such as cockle, mustard, pigeon grass and other small seeds which cannot be separated by the water, since they will not float; and when the seed grain is delivered into the cleaning chamber of the tank B, it is practically free from all foreign matter which would sink with the grain to the bottom of the cleaning chamber. My machine thus affords a most effective and, at the same time, simple apparatus by which the cleaning of grain, particularly such as is intended for seeding purposes, may be quickly effected at a single operation and by its use, farmers are enabled to avoid the expense of both smut mills and fanning mills which are commonly employed in the cleaning of seed grain.

Having thus described my invention what I claim as new and desire to secure by Letters Patent, is:—

A grain-cleaning machine comprising a main frame, a water tank supported within said main frame and having a cleaning chamber provided with an open top, a roller extending across the open top of said cleaning chamber for causing the grain delivered thereto to pass beneath the surface of the water, said roller being located away from the end of the cleaning chamber to form a space for delivery of grain to said chamber, conveyer mechanism for carrying off the cleaned grain from the lower part of the water tank, means for carrying off the refuse from the water tank, a screening shoe mounted above said cleaning chamber, a spout leading from the bottom of said shoe to a point above the space between said roller and the end of the cleaning chamber, an apron extending from said shoe above the discharge end of the water tank for conducting refuse material outside of said chamber, screens within said screening shoe, means for agitating said screening shoe mounted in said frame, and connecting mechanism between said means for agitating the screening shoe and the mechanism for carrying off the cleaned grain and refuse from the water tank.

SAMUEL D. FELSING.

Witnesses:
MAIMIE E. MILETTE,
JOHN J. FLYNN.

Copies of this patent may be obtained for five cents each, by addressing the "Commissioner of Patents, Washington, D. C."